United States Patent [19]
Parker et al.

[11] Patent Number: 4,746,381
[45] Date of Patent: May 24, 1988

[54] METHOD OF MAKING AN END CAP CONNECTION FOR A FLUID-RESISTANCE ELECTRICAL DEVICE

[75] Inventors: Delbert R. Parker; Daren A. Clark, both of Centralia, Mo.

[73] Assignee: A. B. Chance Company, Centralia, Mo.

[21] Appl. No.: 859,488

[22] Filed: May 5, 1986

[51] Int. Cl.$^4$ ............................................. B32B 31/20
[52] U.S. Cl. ................................... 156/69; 29/623; 138/109; 156/294; 156/295; 174/52 S; 337/248
[58] Field of Search ............ 29/623; 156/48, 69, 156/293, 294, 295; 174/52 S; 337/248; 138/109

[56] References Cited
U.S. PATENT DOCUMENTS

| | | | |
|---|---|---|---|
| 3,333,336 | 8/1967 | Cameron et al. | 29/623 |
| 3,911,385 | 10/1975 | Blewitt et al. | 337/202 |
| 4,035,753 | 7/1977 | Reeder | 337/186 |
| 4,044,326 | 8/1977 | Rodrigues | 337/248 |
| 4,057,775 | 11/1977 | Biller | 337/186 |
| 4,063,208 | 12/1977 | Bernatt | 337/248 |
| 4,146,862 | 3/1979 | Mikulecky | 337/252 |
| 4,205,294 | 5/1980 | Jacobs | 337/248 X |
| 4,208,787 | 6/1980 | Luck et al. | 29/623 |
| 4,374,371 | 2/1983 | Narancic | 337/159 |
| 4,519,859 | 5/1985 | Roth et al. | 156/69 |
| 4,628,294 | 12/1986 | Parker et al. | 337/248 |

OTHER PUBLICATIONS

RTE Corporation Bulletin, Dated 5/82 (Supersedes 12-77), Entitled ELSP Current Limiting Back-Up Fuses, pp. 1-8; Section 643.

*Primary Examiner*—Robert A. Dawson
*Attorney, Agent, or Firm*—Hovey, Williams, Timmons & Collins

[57] ABSTRACT

An end cap connection provides a strong mechanical bond as well as a fluid resistant seal between an electrically insulative tubular member and a conductive end piece or cap. The cap is provided with a generally U-shaped channel, and a quantity of synthetic resin adhesive disposed in the channel contacts an end portion of the tubular member as well as walls of the end cap. In one embodiment of the invention, the tubular member has a generally 90° edge for engagement with outer end cap walls defining the channel, such that as the tubular member is shifted toward the bottom of the channel, curved bottom walls defining the latter maintain the tube at a position spaced from the channel bottom to enable the sealing material to fully contact the inserted end of the tubular member. In another embodiment of the invention, the outer channel defining walls of the end cap are magneformed inwardly to compress the adhesive against the tubular member and thus prestress the adhesive so that, during use, thermal expansion and contraction of the connection does not disrupt the bond between the adhesive and the tubular member. Additionally, a castable synthetic resin adhesive having improved bondability and strength after curing is utilized in order to maintain an effective seal regardless of thermal cycling and without the use of O-rings, gaskets or the like.

6 Claims, 2 Drawing Sheets

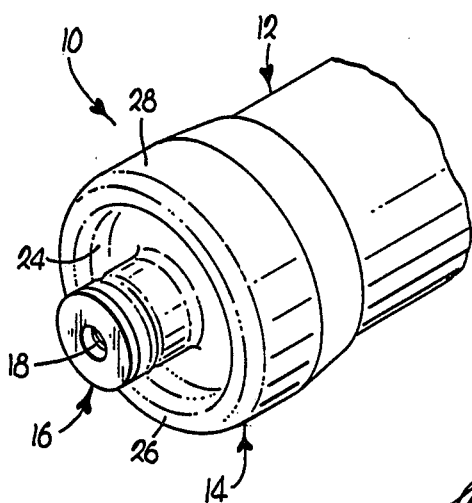
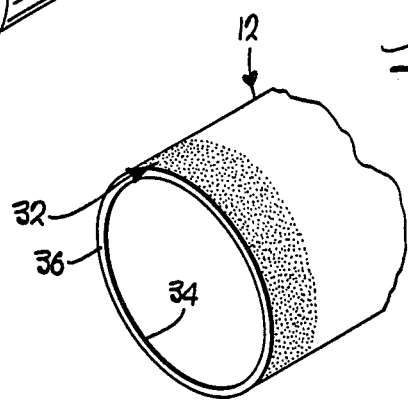
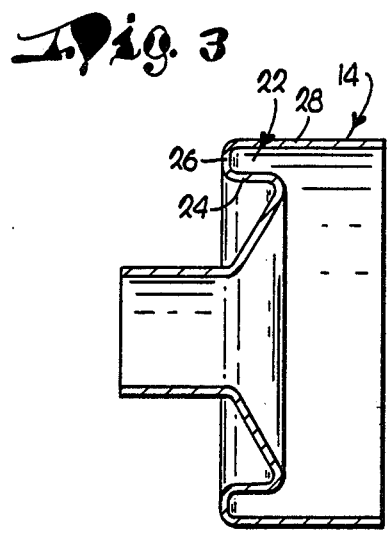
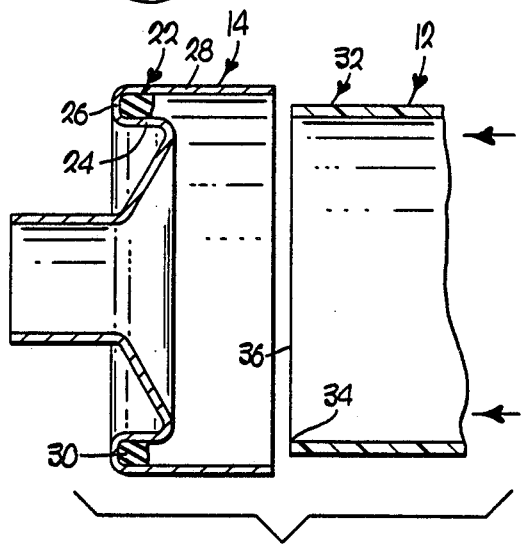
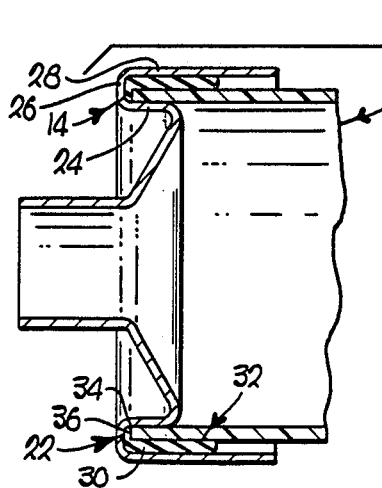

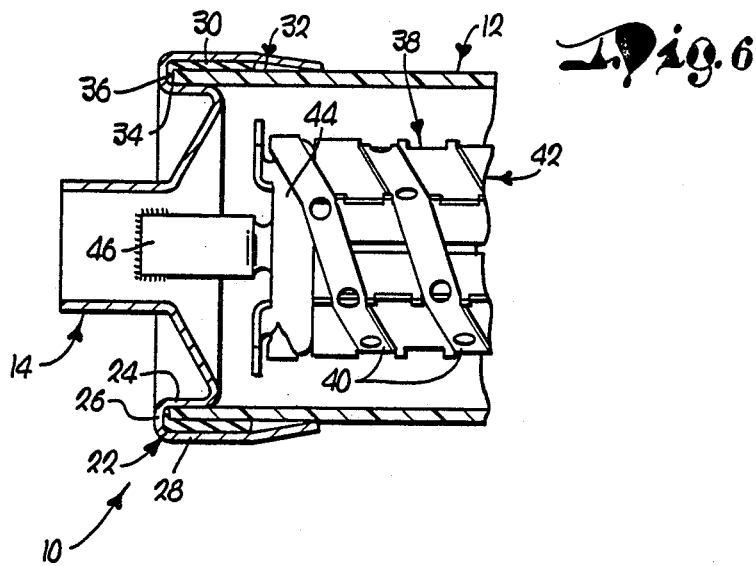
Fig. 6
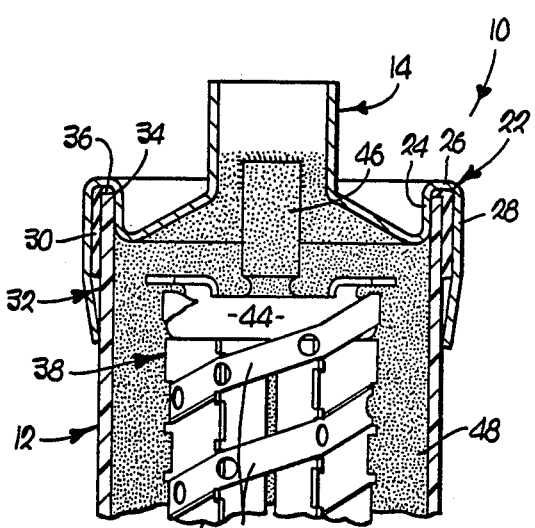
Fig. 7
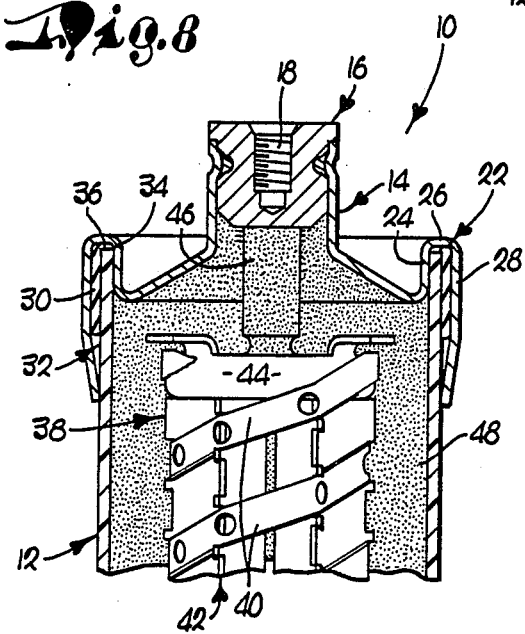
Fig. 8
Fig. 9

METHOD OF MAKING AN END CAP CONNECTION FOR A FLUID-RESISTANCE ELECTRICAL DEVICE

BACKGROUND OF THE INVENTION

1. Field of the Invention

This invention relates to a connection between an electrically insulative tubular member and an electrically conductive end cap, wherein a novel castable synthetic resin adhesive is utilized to bond the tubular member to the end cap and certain walls of the latter are magneformed to prestress the connection for maintaining a fluid-resistant joint during subsequent thermal excursions.

2. Description of the Prior Art

During construction of electrical devices, the securement of insulative tubular members to conductive end pieces or caps has long been a challenge to those in the field. Typically, the end caps are comprised of a metallic material such as copper, aluminum or brass for conducting a current of electricity between an external circuit and an electrical subassembly within the device. On the other hand, the insulative member may be a synthetic resin tube having glass fibers, or alternatively may be comprised of a material such as porcelain or the like.

By way of illustration, current limiting fuses as well as lightning arrestors often include an outer, cylindrical, fiberglass tube with a copper end cap asembly secured to each end of the tube. The end cap assembly commonly has either a lug, a male threaded portion or a threaded bore for releasably fixing an electrical lead to the end cap in order to provide a current path to an electrical subassembly disposed within the insulative tube.

As can be appreciated, it is desirable to provide a means for securely connecting the end cap assembly to the insulative tube to prevent relative movement between the end cap and the insulative tube. During installation, the worker may apply substantial torsional stresses to the assembly as the wire lead is coupled to the end cap in an attempt to preclude subsequent unintentional loosening of the electrical joint. Unfortunately, rotative or axial movement of the cap relative to the tube can irreversibly damage portions of the internal electrical subassembly.

Moreover, such electrical devices are often placed in service in environments which include exposure to fluids. The aforementioned current limiting fuses and lightning arrestors are sometimes immersed in insulating transformer oil within a subgrade or grade level compartment. Alternatively, fuses and lightning arrestors may be mounted atop a utility pole and exposed to rainwater, ice and snow. Consequently, the end cap assembly must sealingly engage the insulating tube in such a manner to enable the device to completely resist the infiltration of fluids over the service life of the device. Moreover, such a seal must not be broken when the device is subject to severe installation stresses.

In the past, a variety of methods have been proposed for securely and sealingly connecting an end cap to an insulative tube. For example, in U.S. Pat. No. 4,063,208 to Bernatt, dated Dec. 13, 1977, an end portion of an insulating tube is provided with a first recess for receiving an O-ring, and a somewhat cup-shaped metallic end piece is mounted over the tube end portion to engage the O-ring. Portions of the end cap are magneformed inwardly to engage the tube in the vicinity of a second tube recess. However, expensive tooling is required to form such recesses, and the tube end portions are weakened somewhat unless the thickness of the tube is increased to provide additional strength. Moreover, the O-ring functions only as a seal and does not contribute to the overall strength of the connection.

U.S. Pat. No. 4,146,862 to Mikulecky, dated Mar. 27, 1979, discloses a connection between an end cap assembly and an insulating tube wherein a gasket having a rounded outermost lip is placed partially within the tube and the latter is inserted into an end cap until the rounded lip is positioned within an annular, epoxy containing groove formed in the end cap. Unfortunately, such construction requires the use of a gasket, thereby raising the costs of the parts and the amount of labor needed for assembly.

Additionally, when the insulating tube is comprised of glass fibers, it is important to prevent fluid from entering the device along leak paths parallel to the disposition of the fibers. During manufacturing of the tube, some of the fibers are sometimes not completely sealed and when the tube is cut to length, breakage of the fiber strands creates additional openings for possible subsequent fluid entry. Accordingly, it is preferable that the ends of fiberglass tubes are completely sealed so that the usable life of the electrical device is not unnecessarily shortened.

SUMMARY OF THE INVENTION

The present invention overcomes the above-noted disadvantages by provision of a novel end cap connection and method for making the same. The connection has sufficient strength to withstand severe torsional stresses during installation and also provides a seal to substantially preclude the entry of fluids over the lifetime of the device, whether the latter is placed in service in outdoor locations or immersed within a tank of transformer oil.

More particularly, the end cap connection of the instant invention comprises a hollow, tubular member or tube having an end portion that is inserted within a transversely U-shaped channel of an end piece or cap. A quantity of initially flowable sealing material located within the channel is displaced by the tube end portion and moves to a position to contact the outermost end of the tube as well as a portion of the sidewalls of the same. Advantageously, the end portion of the tube has an outer 90° edge configured to engage a portion of the end cap channel-defining walls at a position spaced from the bottom of the rounded channel, such that the curved channel walls prevent the end of the tube from engaging the channel bottom. As a result, this mechanical interference creates and preserves a space for sufficient contact of the sealing material with the end of the tube to substantially preclude fluid entry along pathways adjacent broken fiberglass strands.

In preferred forms of the invention, the tube and the end cap have a generally cylindrical configuration, and the end cap has walls extending outwardly from the groove in initially parallel disposition to the tube as the latter is inserted within the channel. Subsequently, the outwardly-extending tube walls are magneformed radially inward to a position adjacent the tube and a portion of the sealing material is thereby compressed between the end cap walls and the end portion of the tube. Thus, during subsequent thermal expansion and contraction of the device, the magneformed cap walls prestress the sealing material toward a configuration to relieve tensile stresses between the sealing material and the tube end portion, and consequently an effective, fluid-resistant seal is maintained.

The sealing material comprises a castable synthetic resin adhesive that cures to a flexible and elastomeric state capable of bonding a variety of materials while maintaining an effective seal. The adhesive is characterized by a particular combination of flexibilizers, rubber modifiers and epoxy resins which impart to the composition outstanding strength and bondability properties while retaining sufficient elasticity to substantially maintain a fluid-resistant seal regardless of subsequent thermal expansion of the tube, end cap and adhesive. As a result, the adhesive, in combination with the magneformed walls of the end cap, provide both a stress resistant connection as well as an effective fluid-resistant seal without the use of separate gaskets or other components.

It has been found that curing of the synthetic resin adhesive at a relatively low temperature substantially reduces the amount of tensile stresses that are exerted on the connection when the device is placed under exposure to both environmental factors as well as generated heat from the conduction of current. That is, by defining the dimensions of the hardened adhesive at a curing temperature that is relatively close to the operating temperature, the adhesive can effectively resist the tensile force tending to separate the adhesive from the tube as the latter undergoes thermal contraction. In particular, the novel adhesive formulation disclosed herein is preferably cured at a temperature of approximately 180° F. to reduce such tensile stresses without unduly lengthening the curing time.

BRIEF DESCRIPTION OF THE DRAWINGS

FIG. 1 is a perspective, fragmentary view of the end cap assembly according to one embodiment of the invention, wherein an end cap has walls that are magneformed to engage an insulating tube of a current limiting fuse;

FIG. 2 is a perspective, fragmentary view of the tube shown in FIG. 1 before assembly, wherein an end portion of the tube is roughened to enhance the bond between an adhesive and the tube;

FIG. 3 is an enlarged, cross-sectional view of the end cap shown in FIG. 1 with the electrical lead engaging insert removed for clarity;

FIG. 4 is an enlarged, fragmentary, side cross-sectional view of the end cap and fuse tube shown in FIG. 1 before assembly, wherein a quantity of a synthetic resin adhesive is placed within a generally U-shaped channel of the end cap;

FIG. 5 is a view similar to FIG. 4 wherein the end portion of the fuse tube has been inserted within the channel of the end cap, and the epoxy is displaced to engage the sidewalls of the fuse tube as well as the end of the latter, this figure also showing a fragmentary, side elevational view of a fusible element internal subassembly that is positioned within the fuse tube;

FIG. 6 is an enlarged, fragmentary, cross-sectional view similar to FIG. 5, wherein wall portions of the end cap are magneformed inwardly to prestress the synthetic resin adhesive after the latter has cured, and the fusible assembly is brazed to walls of the end cap;

FIG. 7 is an enlarged, fragmentary, cross-sectional illustration similar to FIG. 6 wherein a quantity of sand has been added to internal areas of the fuse;

FIG. 8 is a fragmentary, enlarged, side cross-sectioal view similar to FIG. 7, wherein assembly of the current limiting fuse is completed by installation of a generally cylindrical, copper insert having a threaded bore for coupling the device to a lug of an external circuit lead; and FIG. 9 is a fragmentary, enlarged, side cross-sectional view of an assembled current limiting fuse according to a second embodiment of the invention.

DETAILED DESCRIPTION OF THE DRAWINGS

The end cap connection of a fluid-resistant electrical device is shown in FIGS. 1–9 as adapted for use with a current limiting fuse assembly 10, 110. However, it is contemplated that the principles of the present invention may be successfully employed wherever an insulative tube is to be joined to a conductive end cap, as may be provided for other electrical devices such as lightning arrestors.

Referring initially to the embodiment depicted in FIGS. 1–8, FIG. 1 illustrates an electrical device or current limiting fuse 10 having a hollow, cylindrical, electrically insulative tubular member or fuse tube 12 that optionally is formed with strands of glass fiber. The fuse 10 also includes a generally cylindrical, electrically conductive end piece or cap 14, preferably comprised of a metallic material such as copper, aluminum or brass, and having a shouldered insert 16 (see also FIG. 8) with a threaded bore 18 for reception of a bolt (not shown) adapted to releasably and electrically fix a lug of an external electrical lead to the end cap 14.

As viewed in FIGS. 2–8, the end cap 14 has a generally U-shaped channel 22 defined by a cylindrical inner wall 24, a curved bottom 26 and an initially cylindrical outer wall 28. As shown in FIG. 4, a quantity of initially flowable sealing material 30, to be described in more detail hereinafter, is disposed within the channel 22.

During assembly, an end portion 32 of the fuse tube 12 is roughened as shown in FIG. 2 to enhance adhesion between the portion 32 and the sealing material 30. Moreover, the inner diameter of the fuse tube 12 is approximately equal to the outer diameter of the end cap inner wall 24, and the end portion 32 presents an end 36 with an inner edge 34 having a generally 90° configuration in transverse cross-section.

As the fuse tube 12 is shifted in the direction of the arrows shown in FIG. 4, the edge 34 engages the inner wall 24 and simultaneously the end portion 32 displaces a portion of the sealing material 30 until the latter assumes generally the L-shaped configuration illustrated in FIG. 5. The edge 34 slides along the wall 24 as the tube 12 is inserted into the channel 22, until the edge 34 contacts the curved walls comprising the channel bottom 26. Since the diameter of the edge 34 is substantially equal to the outer diameter of the inner wall 24, the tube end portion 32 comes to rest at a position such that the end 36 of the tube 12 is spaced from the bottom 26.

As such, the sharply cornered edge 34, in combination with the curved bottom 26, cooperate to maintain the end portion 32 of the tube 12 in spaced disposition from the bottom 26 to enable the sealing material 30 to fully contact the end 36 of the tube 12. Such construction is particularly advantageous when the fuse tube 12 is comprised of stranded material such as fiberglass, as the end 36 may be cut during manufacture, exposing broken strands and possibly creating pathways for leakage of fluids in the absence of use of the method for making the end cap connection as disclosed herein.

Viewing FIG. 5, an internal subassembly 38 includes a pair of fusible elements 40 which are wrapped around a support assembly 42 and secured to a terminal bracket 44 having an outwardly-extending tab 46. The subassembly 38 is shifted in the direction of the arrows shown in FIG. 5 to a position within the tube 12 as depicted in FIG. 6, whereupon the tab 46 is brazed to an area of the end cap 14.

Subsequently, the sealing material 30 is cured to a hardened condition, and next an outer portion of the wall 28 is magneformed to shift the later in a radially inward direction toward a position of contact with the fuse tube 12. At the same time, the magneforming operation somewhat inwardly moves the remaining portions of the outer wall 28, such that the cured sealing material 30 is compressed between the walls 28 and the end portion 32 of the tube 12. The sharp edge 34 of the tube 12, in combination with the curved bottom 26, enables the cap 14 to support the tube 12 during magneforming of the latter and provide beam strength.

Compression of the sealing material 30 between the wall 28 and the end portion 32 consequently prestresses the sealing material 30 for enhancement of the fluid-resistant characteristics of the connection during subsequent thermal excursions. For example, if the thermal coefficient of expansion of the tube 12 significantly differs from the coefficient of expansion for the sealing material 30, the end portion 32 might excessively contract and pull away from the material 30 at low temperatures, thus endangering the bond between the material 30 and the end portion 32. However, prestressing of the sealing material 30, by such magneforming of the wall 28, enables the material 30 to be placed in compression and thereby relieve tensile stresses between the material 30 and the end portion 32. On the other hand, when the temperature of the fuse 10 is raised, the sealing material 30 becomes more flexible and can expand outwardly, if necessary, toward the unfilled areas between the outer wall 28 and the tube 12.

Preferably, the synthetic resin sealing material 30 is cured at a temperature approximating 180° F., although good results are also obtained whenever the material 30 is cured at a temperature in the range of approximately 150° F. to approximately 210° F. As such, the dimensions of the cured sealing material 30 are defined at a temperature that more closely approximates the operating temperature of the fuse 10, so that as the environmental temperature rises or falls, the stresses due to the differences in coefficients of expansion between the tube 12, the end cap 14 and the sealing material 30 are minimized. In this regard, it is noted that the fuse 10 when immersed in transformer oil is typically subjected to sufficient heat from the latter such that the operating temperature of the fuse 10, in 70° F. ambient air temperature, is often approximately 180° F.

As illustrated in FIG. 7, a quantity of sand 48 is next disposed within the interior portions of the fuse 10 to serve as a support for the subassembly 38 as well as provide an arc extinguishing means should the elements 40 rupture. Finally, as shown in FIG. 8, the insert 16 is positioned within a cylindrical, central portion of the end cap 14 to thereby complete sealing of the fuse 10.

In order to provide an effective sealing agent 30 for the electrical devices of the invention, it is necessary to employ a material that is both sufficiently flexible yet strong enough to maintain sealing integrity through multiple thermal cycles in relatively severe conditions of use. Moreover, the materials being bonded, e.g., synthetic resin tubular members and metallic end caps, have different coefficients of thermal expansion. Finally, it is necessary that the sealing material have a sufficiently low viscosity in its uncured state to be castable.

It has been suggested in the past to employ a combination of rigid adhesives and O-rings to obtain both bonding and sealing. Experience has proved, however, that these composite designs are expensive and sometimes erratic in performance. Accordingly, in preferred forms, use is made of a low viscosity, castable strengthened epoxy system which completely avoids the use of O-rings or the like.

The adhesive/sealing material 30 includes 88 parts by weight of diglycidyl ether of bisphenol A (Epon 828 sold by Shell Chemical Co.), together with 12 parts by weight epoxidized castor oil as a flexibilizer (Epi-Rez 50729 or Epi-Rez 505 sold by Celanese Chemical Co.). The composition further includes polyoxypropylene diamine at a level of 41.4 parts by weight (Jeffamine D400 sold by Jeff Chemical Co.), amine terminated acrylonitrile butadiene (35.7 parts by weight, ATBN Hycar 1300×21 sold by B. F. Goodrich Chemical Co.), and aliphatic amine curing agent at 8.3 parts by weight (Jeffamine 399 sold by Jeff Chemical Co.). These materials are simply admixed in the usual fashion, applied to the joint to be sealed, and allowed to cure.

FIG. 9 illustrates another embodiment of the present invention wherein an assembled current limiting fuse 110 includes a hollow, cylindrical, electrically insulative fuse tube 112, a conductive end piece or cap 114, an internal subassembly 138 including a tab 146 that is brazed to an area of the end cap 114, and a shouldered, generally cylindrical insert 116 received within an outwardly extending, tubular opening of the end cap 114. Except as noted hereinbelow, the various components of the fuse 110 are substantially similar in configuration and are assembled in somewhat the same fashion as the components described with regard to the fuse 10 shown in FIGS. 1-8.

More particularly, the end cap 114 shown in FIG. 9 has an outer, cylindrical wall 128 with an internal diameter slightly larger than the outer diameter of the tube 112. During assembly of the fuse 110, a quantity of sealing material 130 is placed within a U-shaped channel 122 formed between the outer wall 128, a cylindrical inner wall 124, and a curved bottom 126 interconnecting the walls 124, 128. During assembly of the fuse 110, an outer circular edge 135 of the tube 112 slides along the wall 128 as the tube 112 is inserted into the channel 122, until the edge 135 contacts the curved walls comprising the channel bottom 126. As a result, a tube end portion 132 comes to rest at a position such that an end 136 of the tube 112 is spaced from the bottom 126, since the diameter of the edge 135 is substantially equal to the inner diameter of the outer wall 128.

During insertion of the fuse 112 into the end cap 114, the sealing material 130, being initially flowable, is shifted and assumes a generally L-shaped transverse configuration, as shown in FIG. 9. The edge 135, in combination with the curved bottom 126, cooperate to retain the end portion 132 in spaced disposition from the bottom 126 so that the sealing material 30 can fully contact the entire end 136 of the tube 112, as is desired when the latter is comprised of stranded material such as fiberglass.

Subsequently, after installation of the subassembly 138 in similar fashion as described with regard to the subassembly 38 in FIGS. 5-6, the sealing material 130 is cured to a hardened condition. Next, the outer wall 128 is subject to a magneforming operation wherein the wall 128 is shifted in a radially inward direction toward a position of substantially complete contact with the outside surface of the end portion 132. Compression of the wall 128 against the end portion 132 also causes the latter to shift radially inward and compress the sealing material 132 against the inner wall 28, to thereby prestress the sealing material 130 for enhancement of the fluid-resistant characteristics of the connection during subsequent thermal excursions. Next, the synthetic resinous sealing material 130 is cured, preferably at a temperature approximating 180°.

The connection between the end cap 114 an the fuse tube 112 has been found to be reliably fluid-resistant over a wide range of thermal excursions. For example, the thermal co-efficient of expansion of the end cap 114, the tube 112 and the sealing material 130 can vary to such a degree that the tube 12 can expand or contract approximately four times as much as the copper end cap 114, whereas the sealing material 1300 may expand or contract approximately eight times as much as the end cap 114. Consequently, location of the end portion 132 to the outside of the sealing material 130 causes the interface between the sealing material 130 and the end cap 114 to be in compression when the fuse 110 is exposed to colder temperatures, such that the relatively large localized forces developed during thermal contraction can be resisted successfully without damaging the integrity of the fluid-resistant seal.

We claim:

1. A method of mechanically connecting and sealing a hollow, cylindrical member to an end piece comprising:
    placing a quantity of initially flowable, curable synthetic resin adhesive sealing material within an annular, generally U-shaped channel of said end piece wherein said channel is defined by opposed cylindrical sidewalls and curved portions connecting said sidewalls to a bottom portion;
    moving an end portion of said member in a direction toward said channel bottom portion of said end piece through a displacement sufficient to cause substantially the entire area of an annular, outermost end of said cylindrical member to move into direct contact with said sealing material;
    continuing to move the end portion of the member toward said channel bottom portion to cause a cylindrical surface of said end portion and a circular corner disposed between said cylindrical surface of said end portion and said annular end to slide along one of said end piece sidewalls in substantially complete circumferential contact therewith, said cylindrical surface of said end portion and said circular corner being of a diameter substantially equal to the diameter of said one sidewall in contact therewith to thereby align said member to said end piece while shifting a portion of said sealing material along and across the surface of said outermost, annular end and re-distributing certain portions of said sealing material toward other areas of said channel;
    engaging in direct contact said corner of said annular end with one of said curved portions of said end piece such that said end of said member is retained by said one curved portion in spaced relation to said bottom portion of said channel;
    curing said synthetic resin adhesive; and
    magneforming said end piece walls at a time subsequent to said step of curing said adhesive to compress said end portion of said tubular member and thereby prestress said adhesive for substantially precluding subsequent disengagement of said adhesive from said tubular member.

2. The invention of claim 1, wherein said corner comprises an inner corner of said end.

3. The invention of claim 1, wherein said corner comprises an outer corner of said end.

4. The method as set forth in claim 1, wherein said step of curing said adhesive is carried out at a temperature approximating the normal temperature of said device in use.

5. The method as set forth in claim 1, wherein said device is a current limiting fuse, and said curing is carried out at a temperature in the range of approximately 150° F. to approximately 210° F.

6. The method as set forth in claim 5, wherein said curing is carried out at a temperature of approximately 180° F.

* * * * *